F. STELLAR.
INSECT GATHERING AND DESTROYING MACHINE.
APPLICATION FILED JAN. 10, 1918.
1,279,477.
Patented Sept. 17, 1918.
2 SHEETS—SHEET 1
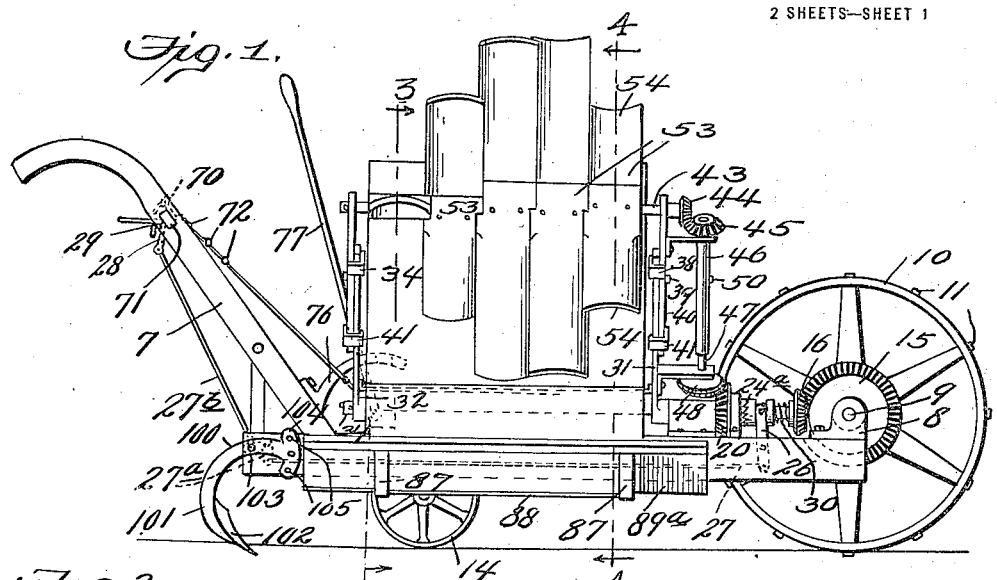

F. STELLAR.
INSECT GATHERING AND DESTROYING MACHINE.
APPLICATION FILED JAN. 10, 1918.
1,279,477.
Patented Sept. 17, 1918.
2 SHEETS—SHEET 2.
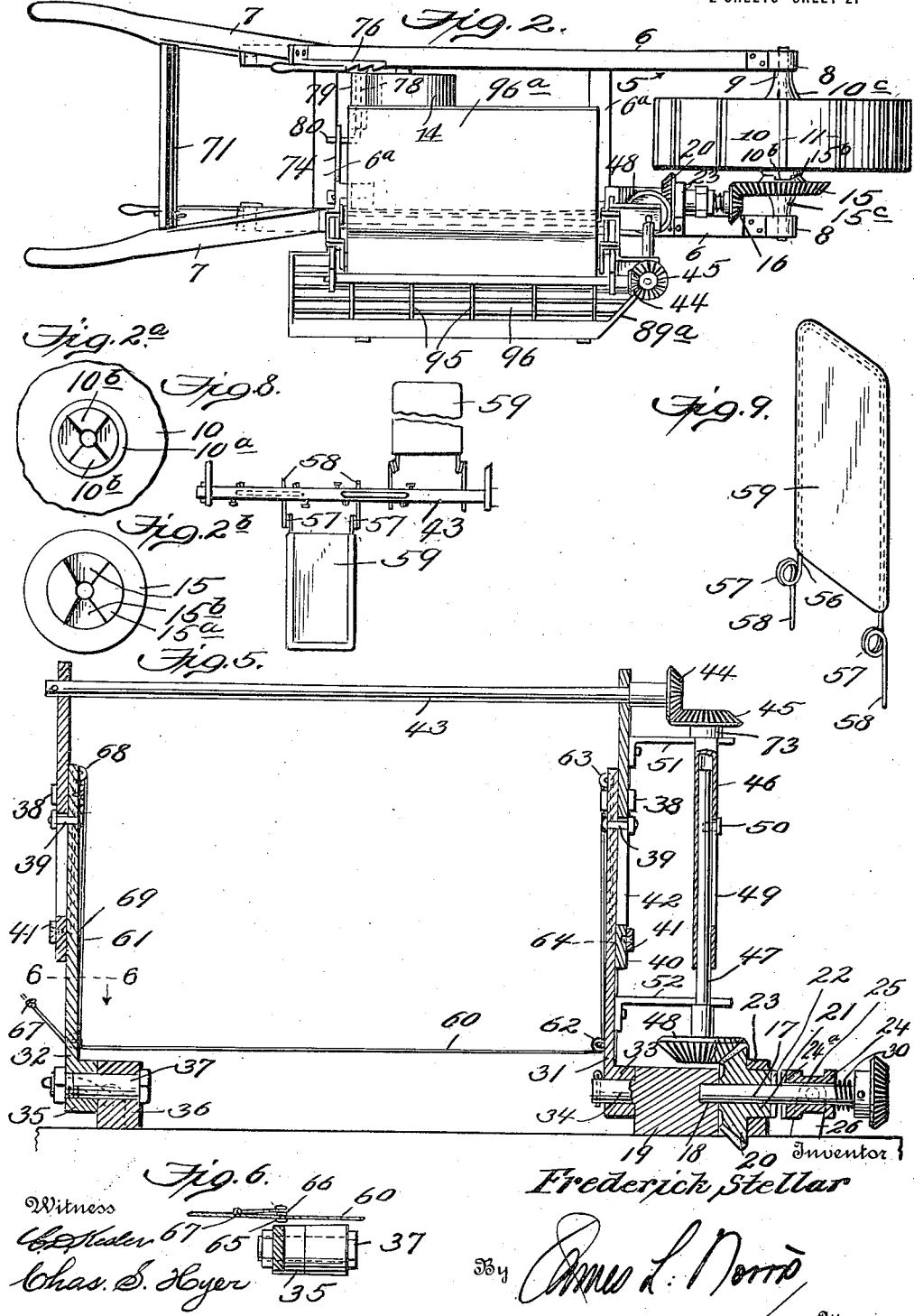

# UNITED STATES PATENT OFFICE.

FREDERICK STELLAR, OF BIRMINGHAM, ALABAMA.

INSECT GATHERING AND DESTROYING MACHINE.

1,279,477.  Specification of Letters Patent.  Patented Sept. 17, 1918.

Application filed January 10, 1918. Serial No. 211,204.

*To all whom it may concern:*

Be it known that I, FREDERICK STELLAR, a citizen of the United States, residing at Birmingham, in the county of Jefferson and State of Alabama, have invented new and useful Improvements in Insect Gathering and Destroying Machines, of which the following is a specification.

This invention relates to machines for removing and destroying boll weevils, potato bugs and other insects from growing plants, vines, and vegetation generally, and particularly to features of improvement relatively to the machine disclosed by my pending application, Serial Number 150,783, filed February 24, 1917. Among other objects of the present invention are to provide means for imparting to plants or vines successive vibratory or shaking insect dislodging movements and at the same time drawing or deflecting the plants or vines toward a destroying means or insect gathering device through the medium of a screw or cone-like action of a spirally bladed rotary beater to insure a thorough elimination of bugs or insects from plants and vines by a positive operation without injury to the bolls, branches or foliage of the plants or vines; to readily adjust the beater to accommodate and practically coöperate with plants or vines of different heights in a row treated, or to adapt the machine for operation with plants varying in height in separate rows without interfering with the regular travel or progress of the machine by means manually actuated to elevate the beater and automatically or gravitatingly lowered when released; to provide for an automatic movement of the beater toward the machine in the event that a stump, rock or other projection is encountered in traversing a row of plants to avoid breaking the blades of the beater; to provide for applying different sizes of repositories for the insects or bugs gathered and in accordance with the character of the plants treated and the sweep thereover of the beater; to provide a beater having blades that are yielding or resiliently constructed to materially reduce the force of the impact of the blades relatively to the vines treated and thereby permit comparatively tender vines to be operated upon by the blades without liability of injuring the foliage of the plants or vines; and to generally improve machines of this type and render them more effective in their construction and operation and insure a ready adjustment of the parts both manually and automatically without requiring a cessation of operation or progress of the machine and to adapt the latter to practically serve with different kinds of plants without injury thereto.

With these and other objects and advantages in view, the invention consists in the preferred construction and arrangement of the several parts which will be more fully hereinafter described and claimed.

In the drawings:

Figure 1 is a side elevation of a machine embodying the features of the invention.

Fig. 2 is a top plan view of the improved machine.

Fig. 3 is a transverse vertical section taken in the plane of the line 3—3, Fig. 1, looking toward the front of the machine.

Fig. 4 is a section taken on the line 4—4, Fig. 1, looking toward the rear of the machine and showing also a different form of blade.

Fig. 5 is an enlarged longitudinal vertical section of a portion of the machine and particularly showing the means for vertically adjusting the beater shaft and its blades and also the manner of assembling the frame carrying the beater shaft and blades relatively to the remaining portion of the machine.

Fig. 6 is a detail horizontal section taken in the plane of the line 6—6, Fig. 5.

Fig. 7 is a detail transverse vertical section through the repository and a portion of the supporting means therefor and indicating the interchangeability of the repositories of different sizes.

Fig. 8 is a detail plan view of the beater shaft and blades as shown by Fig. 4 on a reduced scale, one of the blades being broken through.

Fig. 9 is a detail perspective view of one of the blades shown by Figs. 4 and 8 and which are the preferred blades in the present instance.

Figs. 2$^a$ and 2$^b$ are detail elevations, on a slightly enlarged scale, respectively, of a portion of the front ground wheel and the driving gear for the operating mechanism showing coupling means to avoid the use of set screws or the like.

The numeral 5 designates the main frame comprising opposite side bars 6 to the rear extremities of which handles 7 are attached. The side bars 6 may be suitably connected by cross-ties 6ª as shown in Figs. 2, 3 and 4. In suitable bearings 8 at the front end of the bars 6 an axle 9 is mounted to freely rotate and on this axle a ground wheel 10 is secured and provided with attractive ribs 11, the said ground wheel serving as the prime operating means for the mechanism which will be hereinafter explained. Near the rear extremity of the frame and mounted between the side bars 6 on an axle 12 held in opposite bearings 13 is a roller 14 which preferably extends nearly the entire width between the inner opposing surfaces of the side bars 6 and serves to steady the operation of the machine by traveling in the furrow between rows of plants and also operates as a crushing or pulverizing medium, particularly when the ground between the plant rows is soft or has been cultivated. On the axle 9 a gear 15 is loosely mounted for the purpose of transmitting motion from the said axle to a pinion 16 with which it is held in continual mesh. The gear 15 and pinion 16 are of the beveled type, the pinion 16 being held on the front end of a longitudinally disposed drive shaft 17 extending along a portion of the length of the one side bar 6, as clearly shown by Figs. 1, 2 and 5, and mounted in a bearing bore 18 of a bracket 19, as shown by Fig. 5. On the shaft 17 a transmission bevel gear 20 is mounted and has an elongated hub or sleeve 21 provided with suitable clutch teeth 22 in the front end thereof. The gear 20 and sleeve 21 are loosely mounted on the shaft 17 and the rear face of the gear closely bears against the front end of the bracket 19. The elongated hub or sleeve 21 extends through a suitable bearing 23 secured to the adjacent side bar 6. A clutch sleeve 24 is also loosely mounted on the shaft 17 in advance of the bevel gear 20, a relatively acting groove and spline 25 being provided between the said shaft and the clutch sleeve to cause the latter to rotate with the shaft. The clutch sleeve is suitably grooved for engagement therewith by a clutch lever 26 which is suitably fulcrumed to the inner side of the bar 6 and has an operating lever or rod 27 connected thereto and running rearwardly to a point adjacent to the base of one of the handles 7 and is attached to a bell-crank lever 27ª which in turn is connected by a rod 27ᵇ with a shifting lever 28 fulcrumed on the inner side of one of the handles 7, as clearly shown by Figs. 1 and 2, and coöperating with a suitable locking device or toothed segment, as at 29, to hold the said lever and clutch sleeve in their desired adjusted positions. Between the bevel pinion 16 and the clutch sleeve 24 a spring 30 surrounds the shaft 17 and operates to force the said clutch sleeve into engagement with the sleeve 21 of the transmission gear 20, the rear end of the clutch sleeve being toothed, as at 24ª. It will be understood that the lever 26 is a clutch shifting lever operable by the rods 27 and 27ᵇ through the medium of the bell-crank lever 27ª, and when the lever 28 is drawn rearwardly the shifting lever 26 is operated to force the clutch sleeve 24 into engagement with the gear sleeve or hub 21 of the gear 20 and thereby clutch the said latter gear to the shaft 17. At any time desired, the clutch sleeve 24 may be released by operating the lever 28 in the opposite direction to move the said clutch sleeve forwardly on the shaft 17 against the resistance of the spring 30.

A gathering frame is mounted to swing relatively to one side of the main frame in outward and inward directions. This gathering frame comprises opposite bars or arms 31 and 32, the arm 31 having a lower collar 33 to receive and swing on a stud or bearing projection 34 extending rearwardly from the bracket 19, and the lower end of the arm 32 has a bearing collar 35 which is adapted to engage the rear side of a bracket 36 secured on the side bar 6 carrying the bracket 19, and through the said bracket 36 and collar 35 a combined pivot and coupling bolt 37 is removably inserted. The arms 31 and 32 each have a guide loop or clip 38 secured thereto and below the said clip each of these arms is also provided with a bolt or nutted pin 39, the loop or clip 38 and bolt 39 projecting forwardly from the arm 31 and the loop or clip 38 and bolt or pin 39 of the arm 32 projecting rearwardly from the latter, as clearly shown by Fig. 5. Each arm 31 and 32 also has an extension arm 40 telescopically applied thereto and movable through the clip 38, each extension arm having a guide clip 41 which embraces its adjacent arm 31 or 32. The arms 40 are respectively applied to the front and rear sides of the arms 31 and 32 and each arm 40 has a longitudinal slot 42 which is engaged by the bolt or pin 39 and whereby the said extension arms 40 may move on the arms 31 and 32 in a regular manner without distortion or disarrangement. The extension arms 40 may be of any suitable length and in the upper extremities thereof a beater shaft 43 has bearing and is provided with a bevel pinion 44 on one end which is held in continual mesh with a corresponding pinion 45 of a slightly greater diameter on the end of a telescopic tube or hollow shaft 46 fitted over and movable on an upright transmission shaft 47 provided with a bevel pinion 48 on its lower end held in continual mesh with the bevel gear 20. The tube or hollow shaft 46 is longitudinally slotted, as at 49, and the transmission shaft 47 has a headed stud or pin 50 projecting therefrom through the slot 49. The tube or hollow shaft 46 has bearing in a bracket arm 51 fixed to the forward extension arm 40 above the upper end of the adjacent arm 31, and the shaft 47 has bearing in a similar bracket arm 52 secured to the arm 31 at a point below the maximum lower adjustment of the extension arm 40. On the shaft 43 are a plurality of spirally arranged blades which may be either one of two forms but both forms embody the same principle of operation or have means or components so disposed as to effect successive vibratory action relatively to the bolls of cotton plants or the branches of vines or other plants treated with an easy screw or cone-like action or sweep and whereby each boll or portion of a plant or vine engaged will be treated and thoroughly shaken to dislodge the weevils or bugs and at the same time the foliage and branches of the plants treated will be drawn toward the machine so as to dislodge weevils or bugs from the plants and cause them to be thrown into a repository and destroyed in a manner which will be more fully hereinafter explained. The beater blades 53, as shown by Figs. 1, 2 and 3, are similar in construction and arrangement to those disclosed in my pending application hereinbefore noted. Each of these blades has two concave working faces 54 in reverse positions relatively to the shaft 43 on which the blades are mounted so that each blade when operated will always have a concave face brought into engagement with the plant or vine treated and to thereby draw the insects or bugs toward the center of the blade and also to effect a more positive sweeping and bug or insect dislodging action relatively to the plants with which the blade comes in contact. The blades also have their side edges overlapping fully throughout the lengths of the same or from the shaft fully to opposite free extremities thereof to prevent the escape of insects or bugs between the blades and the movement or passage of any part of a plant between the side edges of the blades to insure an effective dislodgment and gathering of the insects and a thorough treatment of all parts of the plant with which the blades come in contact. The preferred form of beater blade in the present instance is shown by Figs. 4, 8 and 9 which may be used with any kind of plants but are particularly intended for use with potato vines or like small plants of tender growth, each of these blades being indicated by the reference character 55 and consists of a wire frame 56, as clearly shown by Fig. 9, bent into U-form and having opposite spring coils 57 and attaching extremities 58. Over each wire frame a covering 59 of suitable fabric or other material adapted for the purpose is applied. The attaching extremities 58 are secured to the shaft 43 in such manner that one set of extremities will be within the points of attachment of the similar extremities of an adjacent blade to thereby effect a complete overlap of the opposite side edges of the blades. These yielding or spring-actuated blades have a spiral sweeping vibratory motion similar to the blades 53 heretofore described relatively to the vines or plants with which these preferred blades are brought into contact, and the force of their impact or contact relatively to the plants or vines is reduced materially through the yielding action thereof due to the spring coils 57, and, as a consequence, tender vines or plants are prevented from being broken or injured and at the same time insects or bugs are thoroughly removed and conveyed to the point of destruction provided therefor, both sets of blades operating to throw the insects or bugs gathered inwardly toward the machine.

The beater, comprising the shaft 43 and the blades 53 or 55, as the case may be, and the arms 31, 32 and 40, may be swung outwardly varying distances from the side of the machine, and through the extension arms 40 the blades and their shaft may be thrown over varying distances relatively to the plants engaged or upwardly to accommodate plants of varying heights within a row, or to compensate for plants of a comparatively tall character throughout the length of an entire row relatively to the plants of an adjacent row. The movement of the extension arms 40 and the adjustment of the beater shaft 43 and blades 53 or 55 is effected in a very simple manner through the medium of a pull-cord or wire 60 and a supplemental cord or wire 61, the cord or wire 60 engaging a grooved sheave or pulley 62 at the lower extremity of the inner portion of the arm 31 and then passing upwardly and over a similar grooved pulley or sheave 63 at the upper extremity of the same arm and then downwardly and attached to the guide loop or clip 41 of the extension arm 40, as at 64. The cord or wire 60 continues rearwardly and passes over one of two grooved pulleys or sheaves 65 at the lower inner portion of the arm 62, and the supplemental cord or wire 61 is passed over a grooved pulley or sheave 66 on the same bearing as the pulley or sheave 65 and secured to the cord or wire 60, as at 67, (see Fig. 6). The cord or wire 61 is continued upwardly from the pulley 66 and is passed over a grooved pulley 68 on the upper extremity of the arm 32 and is then extended downwardly and connected to the guide loop or clip 41 of the rear extension arm 40, as at 69. The cord or wire 60 continues rearwardly and upwardly from the pulleys 65 and 66 at the lower portion of the arm 32 and is caused to engage a slotted keeper or fork 70 secured to the tie bar 71 of the handles 7, the said cord or wire 60 being knotted or provided with other suitable stop devices, as at 72, for maintaining various adjustments of the extension arms 40 and the beater shaft 43 and blades 53 or 55. It will be seen that by pulling rearwardly on the extremity of the cord or wire 60 engaging the slotted keeper or fork 70 a uniform pulling tension will be exerted on the arms 40 and the latter will be equally raised or caused to slide upwardly on the arms 31 and 32 and thereby regularly elevate both extremities of the shaft 43 and all of the beater blades on the said shaft and at the same time the tube or hollow shaft 46 will be similarly elevated on the solid transmission shaft 47 owing to the fact that the upper bracket arm 51 engages the hub 73 of the bevel pinion 45, the degree of extension or elevation of the arms 40 depending upon the rearward extent of movement of the cord or wire 60. After this adjustment has been obtained it may be maintained by causing any one of the projections or stop devices or knots 72 to engage the rear side of the keeper or fork 70. When the cord or wire 60 is released from the keeper or fork 70, the extension arms 40 and the tube or hollow shaft 46 will gravitate or automatically return to normal position or lower on the respective parts with which they engage.

Extending rearwardly from the collar 35 of the arm 32 is an adjusting arm 74 which extends partially across the machine and has an opening 75 in the free extremity thereof. On the lower portion of the handle 7 rising from the bar 6 opposite that carrying the bracket 36 a toothed segment 76 is secured, and coöperating therewith is an adjusting lever 77 having its upper end within easy reaching distance of the operator. The lower end of the lever is bent at right angles, as at 78, and is free to rotate in a bearing projection 79 secured to the bar 6 adjacent to the segment 76, the free end of the lower angularly bent portion 78 of the said lever terminating in a curved crank arm 80 which projects rearwardly and loosely passes through and is adapted to move in the opening 75 at the inner free extremity of the adjusting arm 74. The arm 74 is disposed at a suitable angle relatively to the arm 32 and by disengaging the lever 77 from the toothed segment 76 the gathering frame as an entirety, including the shaft 43 and the beater blades carried thereby, may be projected sidewise a greater or less distance from the side of the machine which it overhangs, and by this means the entire gathering frame and its components may be vertically adjusted to accommodate the plants treated and to reach over on the latter or to dispose the said gathering frame and its components inwardly over the main frame 5 as far as possible when the machine is not in use. The teeth of the segment 76 are so disposed that the portion of the lever 77 which engages the same will be prevented from moving forwardly after the adjustment is made, but said lever is free to move or shift rearwardly or have an automatic self-adjusting movement for the purpose of permitting the entire gathering frame, including the beater shaft 43 and its blades, to be shifted inwardly should the blades come in contact with a stump, rock, or other projection in the row of plants treated and thereby avoid breaking the blades. By this provision for automatic inward movement of the gathering frame, including the blades, a material advantage results in view of the fact that when plants are in full foliage they often cover obstructions along the line of the row of the same which are not seen by an operator, and if some provision was not made for this automatic relief or adjustment, or inward movement of the beater blades, the latter would be liable to become broken by rapidly striking against the resisting surface or object within the row treated. Another material advantage of the present construction of the beater frame resides in the convenience of assembling and dissociating the same relatively to the brackets 19 and 36. It will be seen that the collar 33 of the forward arm 31 is applied to the rear portion of the bracket 19 and, likewise, the collar 35 of the rear arm 32 is applied to the rear side of the bracket 36. In assembling these arms and the gathering frame as a whole relatively to the brackets 19 and 36, the collar 33 is fitted over the stud 34 and the collar 35 is brought into proper position against the rear side of the bracket 36 and the pivot bolt 37 is then inserted through the bracket and collar and secured. In dissociating the gathering frame the pivot bolt 37 is first removed and the entire gathering frame, including the beater shaft and blades, may then be drawn rearwardly, separating the pinion 48 from the gear 20 and permitting the said gathering frame with all of its components to be disposed in a position relatively to the remaining part of the machine that will effect a condensing of the space occupied by the machine and thereby permit a number of the machines to be advantageously shipped and readily set up in operative condition.

In the present instance, a repository containing a destroying material or liquid is used as in the machine disclosed by my application aforesaid. In this instance, however, the repository is applied in a radically different manner in view of the fact that there is no drive shaft extending through the arms of the beater frame, it having been found that this extra material or the extra length of shaft could be readily dispensed with and replaced by the improved structure hereinafter disclosed. In the present instance the arms 31 and 32 have an outer connecting or supporting bar 81 secured to the outer edges thereof adjacent to the lower extremities of the same, as clearly shown by Figs. 2, 3, 4 and 7. The support for the repository in the present instance comprises arms 82 which may vary in number, two being shown, each arm comprising an inner upwardly inclined hanger member 83 terminating in a U-shaped clip 84 which is removably applied over the bar 81, each hanger 83 intersecting an inner outwardly and downwardly inclined back member 85 which merges into a horizontal member 86 and the latter in turn continues into an upwardly inclined outer member 87, the members 85, 86 and 87 of the two arms 82 being connected by longitudinal strips 88 to thereby provide a skeleton frame for a repository 89 which has a flat bottom 90 and upwardly converging sides 91 continuing into a flared lip 92 at the sides of the top portion of the repository, the ends 93 of the repository being vertically straight and extending fully from the bottom 89 to the upper terminals of the lips. The outermost lip 92 of the repository has a bead or terminal roll 94 to prevent the same from cutting the stalk or foliage of the plants during movement of the machine along the row of plants treated. The repository 89 is longitudinally movable in the frame for supporting the same and may be withdrawn and replaced as desired. It is also proposed to use frames and repositories of varying dimensions in connection with each machine, Fig. 7 indicating that a repository of considerable width and also a frame of corresponding dimensions may be used so as to project the repository well under the plants or foliage of the plants treated and insure a reliable gathering of the insects or bugs dislodged or removed from the plants. The repository 89 in this instance will also be divided by a plurality of partitions 95 to form a corresponding number of compartments 96 in which the poisonous liquid or material is placed to prevent surging of the liquid, the partitions 95 being imperforate. By making the inner and outer sides 91 of the repository as specified or constructing them in such manner that they will inwardly converge, a practical retention of the liquid in the repository or trough 89 is provided for, particularly when an adjustment of the said repository is made, and, furthermore, the insects or bugs gathered that may not be instanly killed or destroyed and attempting to crawl upwardly over the sides will be thrown toward the center of the repository or trough by the movement of the machine and fall back into the liquid and be destroyed. By this means any possibility of escape of the insects or bugs from the repository or trough is prevented. A shield 96ª of arcuate form is provided in the present instance as in my prior construction of machine as disclosed in the application hereinbefore mentioned, said shield standing over and above the frame 5 and close to the ends of the beater blades so that the gathered insects or bugs will be thrown against the said shield and be caused to gravitate downwardly thereover toward the repository. In this instance the shield continues at its lower extremity into an apron 97 which overhangs the inner lip 92 of the repository or trough. The shield 96 is also removably held by the bar 81, being provided with hangers 98 secured thereto and having upper U-shaped clips 99 to removably fit over the said bar, as clearly shown by Fig. 4. The clips 99 do not in the least interfere with the clips 84 of the repository supporting frame for the reason that the said clips engage different portions of the bar. The apron 97, as will be readily understood, causes a positive movement of the insects or bugs into the repository or trough and at the same time means are provided for readily separating the supporting frame from the repository or trough as well as the shield and its apron from the bar 81 and subsequently replacing the said parts in operative position. It will also be seen that the repository or trough and its frame, together with the shield or fender 96 and its apron 97, will be uniformly adjusted by the inward and outward movements of the arms 31 and 32, as indicated by Fig. 4, to thereby lower and raise the said repository or trough in accordance with the elevation of the beater shaft and its blades and to always maintain the same relation between the blades and the repository. The repository or trough in this instance has the front end formed angular, as at 89ª, and slants toward the frame of the machine to provide for a glancing blow or contact of said trough end with obstruction that may be in the path of travel thereof. Guard wires 89ᵇ are also applied to and extend lengthwise of the upper portion of the repository or trough to prevent leaves, twigs and other trash from falling into the trough.

A cultivating attachment is applied to the present improved machine for the purpose of loosening up the soil and removing weed growths between the rows of cotton plants, potato vines, and other plants, said cultivating attachment being readily applied to one of the bars 6, preferably the bar carrying the gathering frame, so as to bring the cultivating devices as close as possible to the rows treated. By means of this cultivating attachment the plants may be treated to remove insects or bugs therefrom and at the same time the ground may be loosened up with advantage in the growth or propagation of the plants. This cultivating attachment consists of a curved arm 100 continuing into a plow post or foot 101 and to which any suitable form of cultivating attachment 102 may be removably applied in a well known manner. The arm 100 is fulcrumed on the outer side of the bar 6, as at 103, and the forward end of this arm is free to move over the bar and is provided with an adjusting clevis 104 formed with a plurality of openings 105 for engagement by an adjusting bolt 106 which is inserted therethrough and into a corresponding opening in the bar 6. This cultivating attachment is so arranged that it is supported by the fulcrum connection and may be readily applied and detached as may be found desirable.

From the foregoing the operation of the machine will be readily understood, and it is proposed to propel the machine by suitable draft appliances or motor means. The machine as a whole is propelled adjacent to a row of cotton plants or vines, and the clutch sleeve 24 will be adjusted to transmit motion of the shaft 17 to the bevel gear 20 and then to the bevel pinion 48, shaft 47, hollow shaft 46 and bevel pinion 45 and from the latter to the pinion 45 and beater shaft 43 to rotate the blades 53 or 55 toward the plants or vines treated. It will be understood that the speed of rotation of the beater shaft 43 and the blades carried thereby may be easily regulated by replacing the pinions 44 and 45 by either larger or smaller pinions which may be readily accomplished through the medium of longer or shorter sleeves or hubs connected to these pinions, as will be readily understood in this art. As the insects or bugs are removed from the bolls, plants or vines by the beater consisting of the blades 53 or 55 and the shaft 43, they are thrown inwardly and downwardly against the shield or fender 96 and then fall over the apron 97 into the repository or trough 89 and are killed. At any time desired, the beater shaft and its blades may be raised, as hereinbefore indicated, without in the least interfering with the progress of the machine, to accommodate plants of varying heights. In transporting the machine to and from the plants or vines, or during the time that the operation of the beater is undesirable, the clutch sleeve 24 may be readily detached from the toothed hub of the gear 20 and thereby cause cessation of rotation of the beater. Furthermore, when the machine is backed, the said clutch sleeve will automatically release itself and avoid any reversal of rotation of the beater, the said clutch sleeve also automatically restoring itself into engaging position with relation to the hub of the gear 20 when the machine is subsequently moved forward. This last automatic operation is very advantageous in view of the fact that there is no liability of breakage or injury of the beater components by sudden reversal or backing movement of the machine, and, moreover, the machine may be reset in a rearward direction as it were, for instance, to repeat the beating operation thereof relatively to certain plants or vines that may be discovered to need further treatment, without requiring any particular attention or adjustment on the part of the operator. The ground wheel 10 and gear 15 may be held in operative association on the shaft 9 by any means adapted for the purpose, but it is preferred to use coupling or locking means that may be quickly and positively assembled and avoid the use of set screws and analogous devices. The ground wheel is at one side and centrally has a boss $10^a$ with opposed segmental projections $10^b$, and the adjacent side of the gear 15 has a boss $15^a$ with complemental segmental recesses $15^b$ to receive the said projections $10^b$ in interlocking relation. The wheel 10 on the side opposite that provided with the boss $10^a$ has a tapered hub projection $10^c$, and the outer side of the gear 15 has a similar tapered hub projection $15^c$ so that when the wheel 10 and gear 15 are slipped over the shaft 9 they will be prevented from moving out of place or shifting and a positive interlock of the gear with the wheel will ensue because the space between the forward extremities of the side bars 6 will be fully taken up, and all of these primary driving parts may be readily mounted in place and dissociated when desired.

What is claimed is:

1. In a machine of the class described, insect gathering means having a spiral vibratory operation relatively to plants or vines engaged thereby and comprising a rotary beater having blades with overlapping side edges, supporting devices for the beater having manually operative longitudinally extensible slidable members carrying the said beater to project the latter to treat plants or vines of varying heights during the travel of the machine and for releasing the beater from extended position and permitting it to automatically assume its normal position, and means for extending said members relatively to the supporting devices.

2. In a machine of the class described, insect gathering means having a spiral vibratory operation relatively to plants or vines engaged thereby and comprising a rotary beater having blades with overlapping side edges, supporting devices for the beater pivotally mounted to have a sidewise swinging movement and provided with longitudinally extensible slidable members carrying the beater for projecting the latter varying distances from the pivotal point of said supporting devices to treat plants or vines of varying heights during the travel of the machine, and means for extending said slidable members and releasing them and permitting the beater to automatically assume its normal position during travel of the machine.

3. In a machine of the class described, insect gathering means having a spiral vibratory operation relatively to plants or vines engaged thereby and comprising pivotally mounted supports provided with longitudinally slidable members, a rotary beater carried by the outer extremities of said members, devices for extending said members and beater to treat plants or vines of varying heights and for releasing the members and permitting the beater to automatically assume its normal position during travel of the machine, and operating mechanism for the beater in part extensible with the said members to compensate for the extension of the beater, the extensible part of the operating mechanism also assuming its normal position when the members are released from extended adjustments.

4. In a machine of the class described, insect gathering means including a beater having blades with overlapping side edges throughout the full length of said blades, pivotally mounted supports for the beater provided with longitudinally slidable members carrying the beater, manually operative means connected to the said members for manually extending the latter and maintaining the beater in adjusted position during the travel of the machine, the members and beater when released being permitted to have an automatic lowering movement to normal positions from an extended adjustment, and mechanism for rotating the beater.

5. In a machine of the class described, insect gathering means including a beater having a swinging mounting and devices for extending the same in addition to its swinging adjustment, and a destructive repository held in a position to receive insects gathered by the beater, and means for adjusting said beater and repository in a sidewise direction to unitedly and correspondingly vary the angle and elevation thereof.

6. In a machine of the class discribed, insect gathering means including a rotary beater having a swinging mounting to permit the same to project over one side of the machine at different elevations, the beater being free to move inwardly over the machine when engaging an obstructing object to prevent breaking the parts of the beater, and means for holding the beater against depression below a desired adjusted position thereof.

7. In a machine of the class described, insect gathering means including a rotary bladed beater, and means for giving the beater a laterally swinging adjustment at varying elevations including means for preventing the beater from lowering below a predetermined adjusted level, the beater being free to automatically swing inwardly over the machine when the blades thereof meet a resisting obstruction to prevent breaking the blades.

8. In a machine of the class described, insect gathering means comprising swinging arms having extension arms mounted thereon, a beater shaft having bearing in the upper ends of the extension arms and provided with a plurality of blades, drive mechanism for the beater shaft and blades including a solid shaft with a tubular shaft extensibly mounted thereon, and means attached to the extension arms for unitedly and equally raising the latter, the extension arms together with the beater shaft and blades on the latter having an automatic lowering movement when released.

9. In a machine of the class described, a frame including a side bar, brackets mounted on the said bar in alinement, the forward bracket having a rearwardly projecting stud and the rear bracket provided with an opening therethrough, a swinging arm mounted on the stud of the forward bracket, a rear swinging arm applied to the rear bracket, a pivot bolt removably engaging the rear bracket and the lower extremity of the rear swinging arm, a beater shaft having beater blades supported by the said swinging arms, mechanism including gears for operating the beater shaft, the swinging arms and beater shaft with its blades being detachable and rearwardly removable relatively to the brackets, and means for maintaining the adjustment of the arms and beater shaft and blades.

10. In a machine of the class described, swinging arms, one of the arms having an inward projection at its lower extremity provided with an opening therein, a beater shaft having blades thereon supported by the said swinging arms, a lever pivotally mounted on the machine and having a lower angularly bent portion terminating in a curved extremity loosely engaging the opening in the said projection, and a toothed segment for engagement by the said lever for maintaining the latter in its adjusted position and holding the swinging arms and beater shaft and blades against a predetermined lowered position, the lever being free to swing rearwardly on the toothed segment and permit the arms and beater shaft and its blades to have an automatic inward swinging movement.

11. In a machine of the class described, insect gathering means including a rotary bladed beater, swinging arms carrying the said beater and provided with a support connecting the same, a repository comprising a frame having a hanger member detachably engaging the said support, a repository removably mounted in said frame, and a fender detachably held by said support above and coöperating with the said repository, the repository and its frame being replaceable by similar devices of different dimensions.

12. In a machine of the class described, insect gathering means including a rotary bladed beater, swinging arms carrying said beater and having a supporting device connecting the same and movable therewith, a repository frame provided with upwardly and inwardly extending hangers terminating in clips removably engaging the said supporting device, a repository or trough removably mounted in the said frame, and a shield above the repository or trough and also provided with devices detachably engaging the said supporting device and having a lower apron extending over and into the upper portion of the repository or trough.

13. In a machine of the class described, insect gathering means including a rotary bladed beater, swinging arms carrying said beater and provided with a supporting device connecting the same, a repository frame detachably connected to the said supporting device, a repository or trough removably mounted in the said frame and having opposite upwardly converged sides continuing into outwardly flared lips and also provided with imperforate partitions throughout the length thereof, and a fender also held by the said supporting device and having the lower portion thereof extended over and into the upper part of the repository or trough.

14. In a machine of the class described, insect gathering means including a rotary beater having blades arranged thereon at different angles, the side edges of the blades overlapping, each blade comprising a frame having spring coils adjacent to the attaching extremities thereof and also provided with a fabric covering.

15. An insect gathering means for a machine of the class described comprising a rotary shaft having a plurality of blades thereon consisting of wire frames with extremities attached to the shaft inside of the plane of the similar extremities of adjacent blades to provide an overlap of the side edges of the blades, the frames of the blades having spring coils adjacent to their attaching extremities and also provided with a covering material.

16. An insect gathering means of the class described comprising a frame embodying parallel side bars, a rotary beater, a shaft extending across and having bearing in the forward extremities of the side bars, a ground wheel having a hub member terminally engaging the inner face of one of the side bars at one extremity and the opposite extremity provided with segmental projections and recesses, a gear having a hub with segmental projections and recesses at one extremity to interfit with relation to the segmental projections and recesses of the ground wheel hub, the opposite extremity of the gear hub engaging the inner face of the opposite side bar, the ground wheel and the gear being structurally independent and the shaft and ground wheel mounted to freely rotate together and the gear loosely mounted on the shaft, the ground wheel and gear and their hubs fully occupying the space between the side bars to avoid the use of securing devices, other than the side bars, to hold the parts in operative position, and mechanism between the said gear and beater for operating the latter, the hub members of the ground wheel and gear both being mounted on the shaft and taking up the space between the side bars to effect an engagement of the segmental projections and recesses on the inner extremities of the hub members of the ground wheel and gear.

17. In a machine of the class described, insect gathering means including a rotary beater and a repository or trough mounted in receptive position relatively to the said beater and having opposite upwardly converged sides continuing into outwardly flared lips along the opposite side portions thereof to increase the capacity of the lower portion of the trough and prevent the insects from readily escaping from the trough when deposited in the latter and also to provide a flaring inlet to the trough for readily receiving the insects driven toward the trough by the beater.

In testimony whereof I have hereunto set my hand in presence of two subscribing witnesses.

FREDERICK STELLAR.

Witnesses:
B. C. Cox,
John C. Moses.

Copies of this patent may be obtained for five cents each, by addressing the "Commissioner of Patents, Washington, D. C."